(12) United States Patent
Blivet et al.

(10) Patent No.: US 7,845,685 B2
(45) Date of Patent: Dec. 7, 2010

(54) INSTANT COUPLING DEVICE WITH LOCKING AND/OR DISCONNECTION MEANS

(75) Inventors: Philippe Blivet, Rennes (FR); Philippe Poder, Guichen (FR)

(73) Assignee: Legris SA, Rennes (FR)

( * ) Notice: Subject to any disclaimer, the term of this patent is extended or adjusted under 35 U.S.C. 154(b) by 569 days.

(21) Appl. No.: 11/795,689

(22) PCT Filed: Jan. 27, 2006

(86) PCT No.: PCT/FR2006/000184

§ 371 (c)(1),
(2), (4) Date: Jul. 20, 2007

(87) PCT Pub. No.: WO2006/084969

PCT Pub. Date: Aug. 17, 2006

(65) Prior Publication Data

US 2008/0129047 A1    Jun. 5, 2008

(30) Foreign Application Priority Data

Feb. 10, 2005    (FR) .................................. 05 01325

(51) Int. Cl.
*F16L 37/18*    (2006.01)
(52) U.S. Cl. .................. 285/314; 285/323; 285/362; 285/377; 285/401
(58) Field of Classification Search .......... 285/1, 285/2, 3, 33, 305, 307, 308, 314, 319, 323, 285/360, 362, 376, 377, 401, 921
See application file for complete search history.

(56) References Cited

U.S. PATENT DOCUMENTS

| 5,029,904 | A | * | 7/1991 | Hunt | ........................... 285/24 |
| 5,131,687 | A | * | 7/1992 | Marchou | ...................... 285/23 |
| 5,226,680 | A | * | 7/1993 | Bahner et al. | ................. 285/93 |
| 5,297,823 | A | * | 3/1994 | Dubost | ........................ 285/317 |
| 5,499,848 | A | * | 3/1996 | Kujawski | ..................... 285/93 |
| 5,890,749 | A | * | 4/1999 | Fukaya et al. | ............... 285/319 |
| 2007/0120362 | A1 | | 5/2007 | Poder | |

FOREIGN PATENT DOCUMENTS

FR          2 863 683 A       6/2005

* cited by examiner

*Primary Examiner*—James M Hewitt
*Assistant Examiner*—Jay R Ripley
(74) *Attorney, Agent, or Firm*—Young & Thompson

(57) ABSTRACT

A coupling device for coupling a pipe end to a circuit element, the device including a body axially subdivided into a joining section for joining to the circuit element and a connection section provided with a housing for receiving the pipe end, and elements for engaging it in leaktight manner, the engagement elements including at least one arm extending axially from the connection section and having a free, gripper end for gripping the pipe end, the arm being elastically deformable between a gripping state and a release state for releasing the pipe end; and a holding ring connected to the connection section to receive a portion of the pipe end and to pivot between a position allowing free deformation of the arm, and at least one holding position in which a surface of the ring holds the arm in one of its two states.

20 Claims, 5 Drawing Sheets

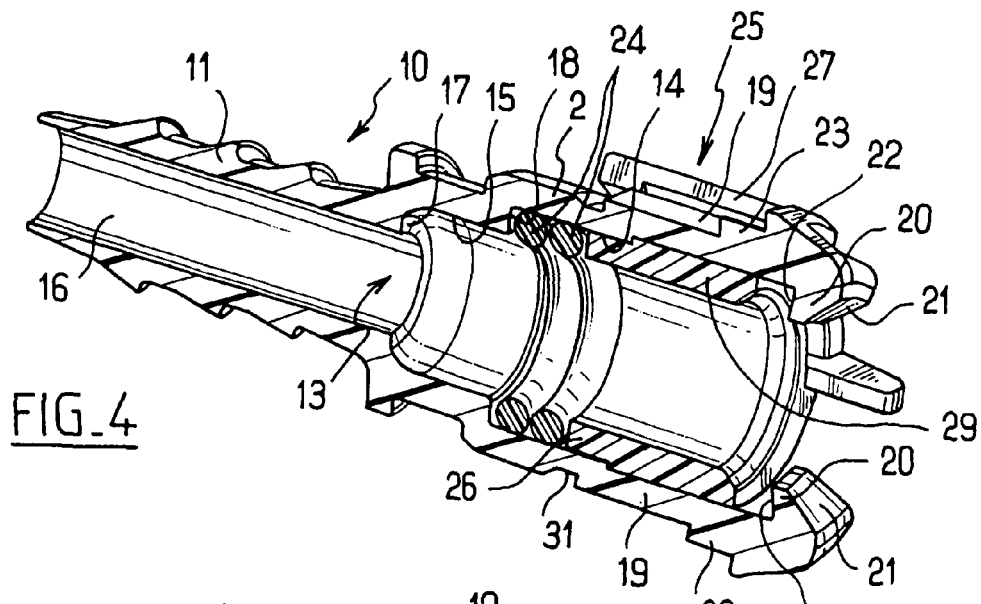
FIG_4
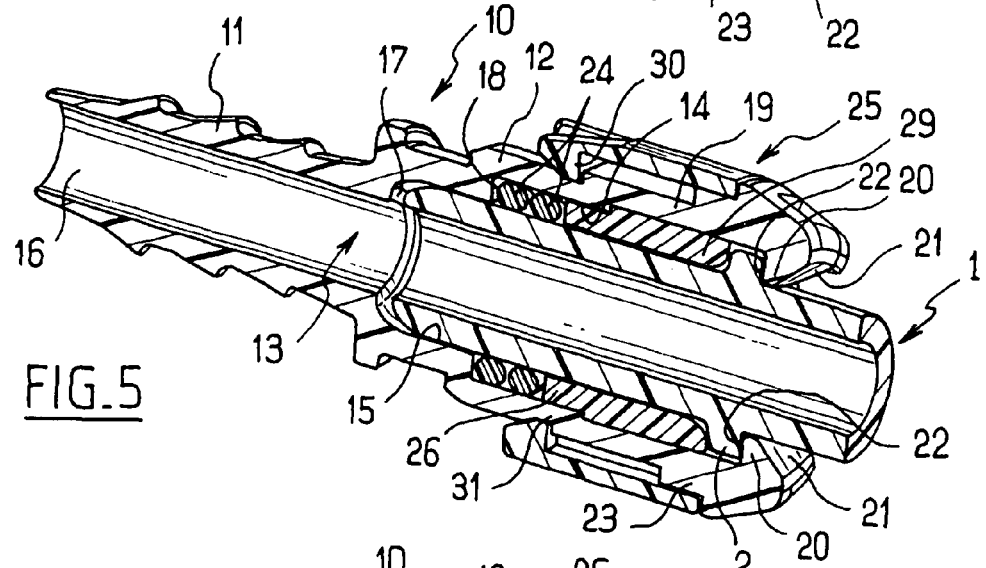
FIG_5
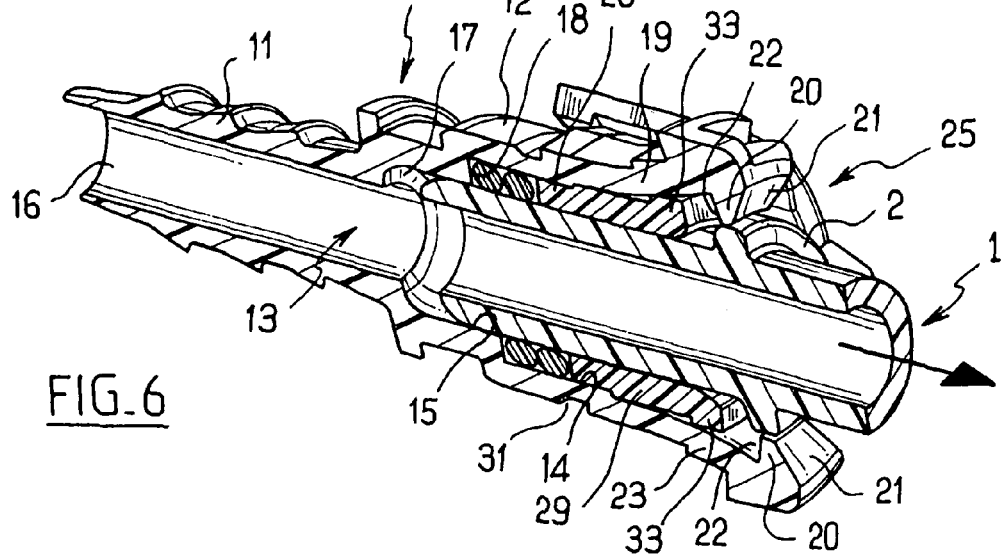
FIG_6

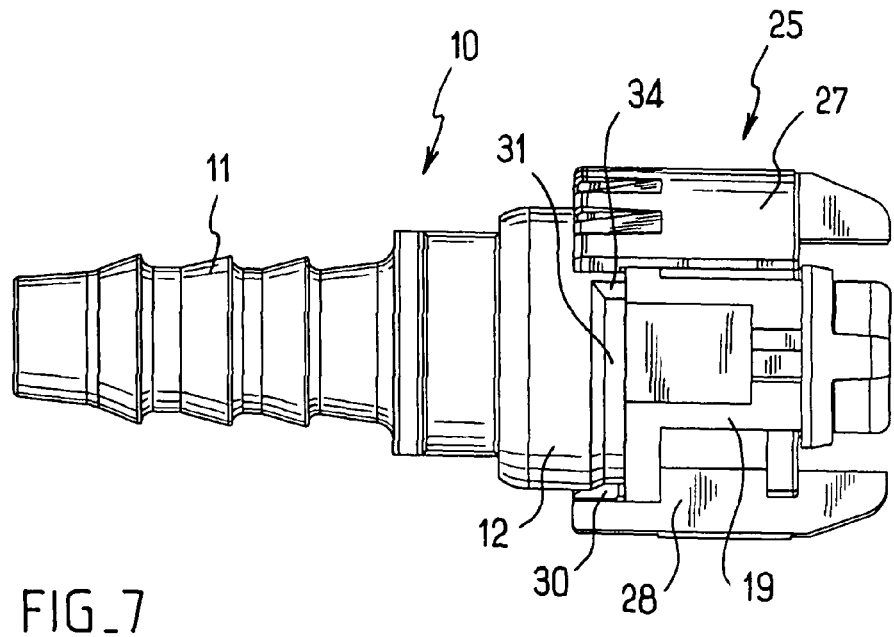
FIG_7
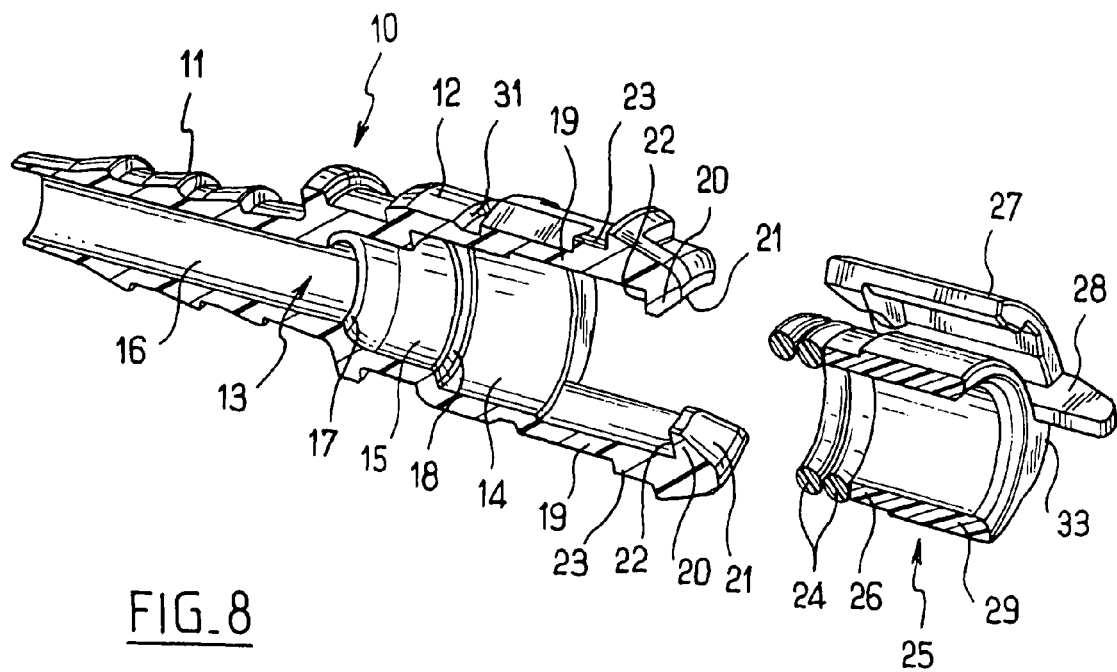
FIG_8

INSTANT COUPLING DEVICE WITH LOCKING AND/OR DISCONNECTION MEANS

The present invention relates to an instant coupling device usable for example in a circuit for transporting a fluid such as air, in order to connect a pipe end to a circuit element that emits or receives fluid, such as a hose, an actuator, a pump, a manifold, etc.

BACKGROUND OF THE INVENTION

An instant coupling device generally comprises a body that is axially subdivided into a joining section for joining to the circuit element and a connection section provided with a housing for receiving the pipe end and means for engaging therewith in leaktight manner. These means generally comprise arms that extend axially from the connection section, each having a free, gripper end for gripping the pipe end, each arm being elastically deformable between a gripping state and a state for releasing the pipe end. Some devices include a ring mounted on the body to slide between a position in which the ring surrounds the gripper ends of the arms to hold them in a gripping position, and an axially offset position in which the ring is disengaged from the gripper ends of the arms and allows them to bend.

OBJECT OF THE INVENTION

An object of the invention is to provide a high-performance alternative to existing solutions.

BRIEF SUMMARY OF THE INVENTION

According to the invention, there is provided an instant coupling device for coupling a pipe end to a circuit element, the device comprising a body axially subdivided into a joining section for joining to the circuit element and a connection section provided with a housing for receiving the pipe end, and means for engaging it in leaktight manner, the engagement means comprising:
- at least one arm extending axially from the connection section and having a free, gripper end for gripping the pipe end, the arm being elastically deformable between a gripping state and a release state for releasing the pipe end; and
- a holding ring connected to the connection section to receive a portion of the pipe end and to pivot between a position allowing free deformation of the arm, and at least one holding position in which a surface of the ring holds the arm in one of its two states.

The ring can thus contribute to guiding the pipe end in the body.

In a first embodiment, when the ring is the holding position, the arm in its gripping state is received at least in part under a flap of the ring having an inside surface that opposes deformation of the arm towards its release state.

This structure is particularly simple and effective.

In this embodiment and preferably, the inside surface of the flap and an outside arm have complementary portions in relief for co-operating when the ring is in the holding position to retain the ring releasably in its holding position.

This serves to limit any risk of the ring being moved accidentally.

In a second embodiment, when the ring is in the holding position, the arm co-operates with a ramp of the ring for lifting the arm to bring it into its release state.

This arrangement serves to facilitate disconnecting the pipe end.

In a third embodiment, combining the advantages of the two preceding embodiments, the ring possesses two holding positions that are angularly offset from each other, and preferably, the two holding positions are situated on either side of the free deformation position.

Advantageously, the housing receives at least one sealing element, and the ring includes a tubular abutment portion arranged to retain the sealing element in the housing, and preferably, the tubular abutment portion is pivotally received in the housing.

Thus, the ring performs an additional function of retaining the sealing element in the housing, which can make it possible to limit the number of component parts making up the coupling device.

Other characteristics and advantages of the invention appear on reading the following description of a particular, non-limiting embodiment of the invention.

BRIEF DESCRIPTION OF THE DRAWINGS

Reference is made to the accompanying drawings, in which:

FIG. 4 is a perspective view of the coupling device in section on plane IV of FIG. 2;

FIG. 5 is a perspective and section view of the device with the holding ring being in a position for locking the connection;

FIG. 6 is a view analogous to FIG. 5, the locking ring being in a disconnection position;

FIG. 7 is an elevation view of the coupling device shown in FIGS. 2 and 4;

FIG. 8 is an exploded perspective view in axial half-section showing a coupling device constituting a first variant embodiment;

DETAILED DESCRIPTION OF THE INVENTION

Figure 1:
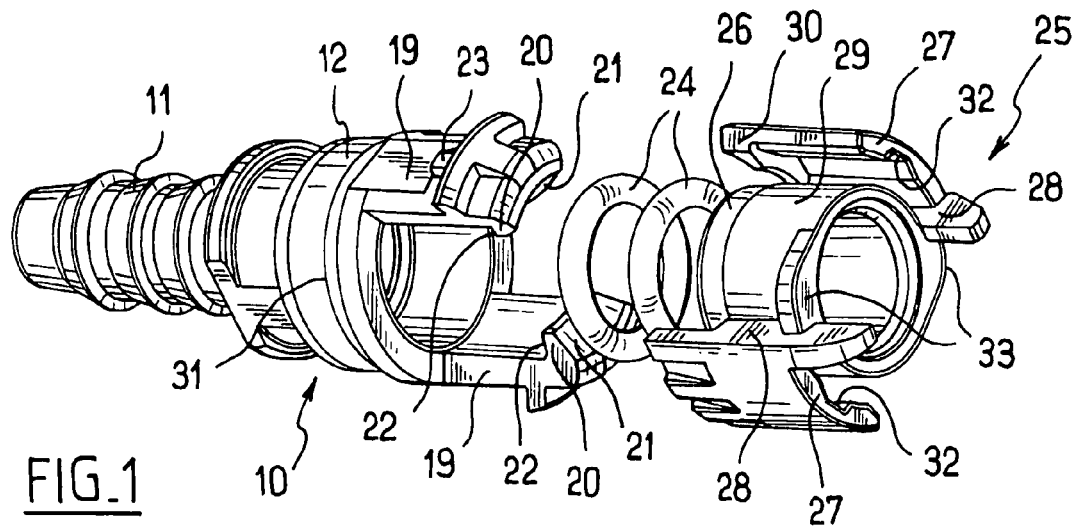
FIG. 1 is an exploded perspective view of the coupling device in accordance with the invention.

With reference to FIGS. 1 to 7, the coupling device in accordance with the invention is intended to enable an endpiece 1 provided with an outer collar 2 to be coupled with a circuit element (not shown), specifically a hose. The circuit element may be a fluid emitter or receiver, such as, for example, not only a hose, but a manifold, an actuator, a pump, a tank, a filter, a valve, . . . . The endpiece 1 may also be associated with a circuit element of this type.

The device in accordance with the invention comprises a body given overall reference 10 that is tubular in shape, defining a stepped channel given overall reference 13. The body 10 is subdivided axially into a joining section 11 for joining to the hose, and a connection section 12 for connection to the endpiece 1.

The joining section 11 defines an end segment 16 of the channel 13 and in this example is provided with teeth in relief forming a Christmas tree-shaped spigot. The end segment 16 of the channel 13 has an inside diameter substantially equal to the diameter of the endpiece 1. The joining section 11 is for engaging as a force-fit in one end of the hose to be coupled. The joining section 11 may equally well be integral with the circuit element or it may be welded thereto, or indeed it may be arranged to be snap-fastened in or on an endpiece secured to the circuit element. The joining section 11 may also be arranged like the connection section 12.

The connection section 12 defines an end segment 14 and an intermediate segment 15 of the channel 13. The end segment 14 opens to the outside of the body 10 at one end thereof remote from the joining section 11, and the intermediate segment 15 extends between the end segments 14 and 16. The intermediate segment 15 is of a diameter slightly greater than the outside diameter of the endpiece 1, and the segment 14 has a diameter greater than the diameter of the segment 15. Shoulders 17, 18 extend respectively between the end segment 16 and the intermediate segment 15, and between the intermediate segment 15 and the end segment 14. The segments 14 and 15 thus form a housing for receiving the free end portion of the endpiece 1.

The body 10 has two arms 19 that face each other, projecting axially from the connection section 12. Each of these arms 19 has a free end or gripping end provided with an internal step 20 with a front face 21 that is concave and that flares, and with a rear face 22 that is radial. The arms 19 are elastically deformable between a rest state referred to as a gripping state, in which the internal steps 20 define a through section of diameter smaller than the outside diameter of the collar 2, and a deformed state, referred to as a release state, in which the internal steps 20 define a through section of diameter equal to or greater than the outside diameter of the collar 2. Each arm 19 also has an external step 23.

Sealing elements 24 of annular shape are received in the end segment 14 in the vicinity of the shoulder 18.

The coupling device includes a holding ring given overall reference 25 that is received between the arms 19 and that comprises a main portion 29 and an end portion 26 received in the end segment 14 in such a manner that the holding ring 25 can pivot between two extreme positions described in detail below. The end portion 26 of the holding ring 25 serves to retain the sealing elements 24 in the end segment 14. The main portion 29 has an inside diameter that is slightly greater than the outside diameter of the end portion of the endpiece 1, and an outside diameter that is greater than the inside diameter of the end segment 14 and less than the distance between the arms 19. The end portion 26 has an inside diameter slightly greater than the outside diameter of the end portion of the endpiece 1, and an outside diameter slightly smaller than the inside diameter of the end segment 14. Between the portions 26 and 29, the holding ring 25 has an external shoulder forming an abutment against the holding ring 25 being pushed into the end segment 14.

The holding ring 25 has two external flaps 27 which in this example are diametrically opposite. The flaps 27 are curved and extend parallel to the outside surface of the main portion 29 at a distance therefrom in such a manner that, in one of the extreme positions of the holding ring 25, each arm 19 can be received between one of the flaps 27 and the outside surface of the main portion 29. Each flap 27 has an edge parallel to the axis of the holding ring 25 and connected to the main portion 29 by a radial wall 28 extending between the two arms 19.

Beside the joining section 11, each flap 27 possesses a circumferential edge possessing a step 30 received in an external groove 31 in the connection section 12 so that the holding ring 25 is retained in the connection section 12 by snap-fastening. A rib 34 extends into the external groove 31 to form an abutment for the step 30 so as to index the holding ring 25 relative to the arms 19 as described in detail below.

Each flap 27 also possesses an inside surface provided with a setback 32 for receiving the external step 23 of the corresponding arm 19.

In the vicinity of the radial wall 28 of each flap 27, and on its side opposite from the corresponding flap 27, a ramp 33 extends along a circumferential direction over the main portion 29 and projects radially outward therefrom.

The two extreme positions of the holding ring 25 are explained below.

In the first of its extreme positions, a locking position (shown in FIG. 5), each flap 27 covers one of the arms 19 and has an inside surface holding the arm 19 in its gripping state by opposing any deformation of the arm 19 towards its release state. The external step 23 of each arm 19 and the setback 32 of each flap 27 receiving the external step 23 serves to retain the holding ring 25 in its locking position in releasable manner by snap-fastening. The external steps 23 and the setbacks 32 constitute indexing means for indexing the holding ring 25 in its locking position.

In the second extreme position, or disconnection position, as shown in FIG. 6, each ramp 33 extends under one of the arms 19 to deform it into its release state.

Between these two extreme positions, the holding ring 25 possesses an intermediate position, or free deformation position, also known as an instant connection position, in which each arm 19 is disengaged from the corresponding flap 27 and ramp 33 so as to be free to deform between its two states.

Figure 2:
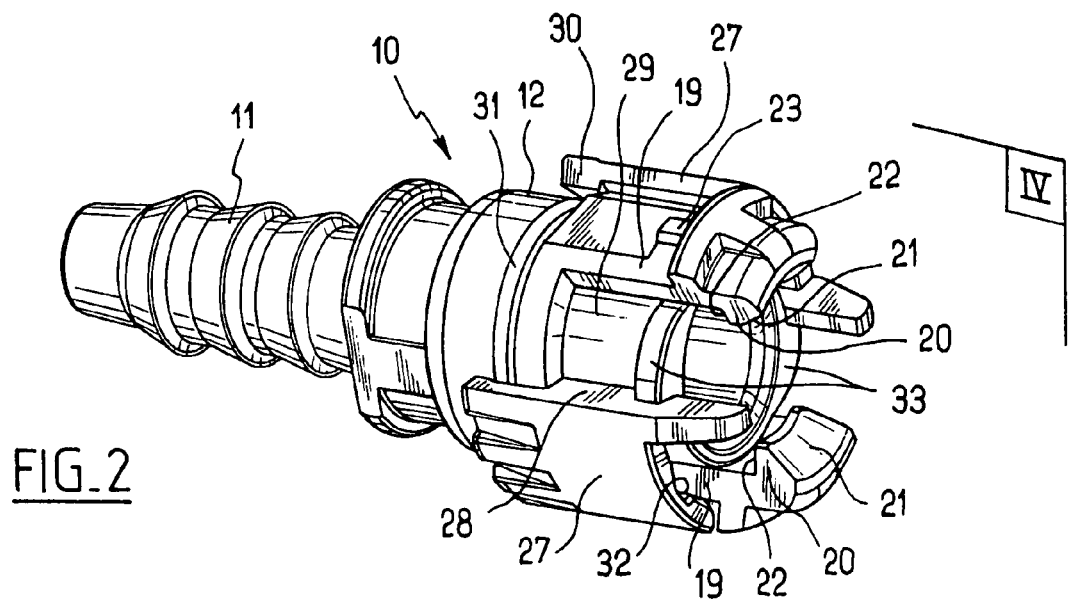
FIG. 2 is a perspective view of the coupling device with the holding ring in an instantaneous connection position.
Figure 3:
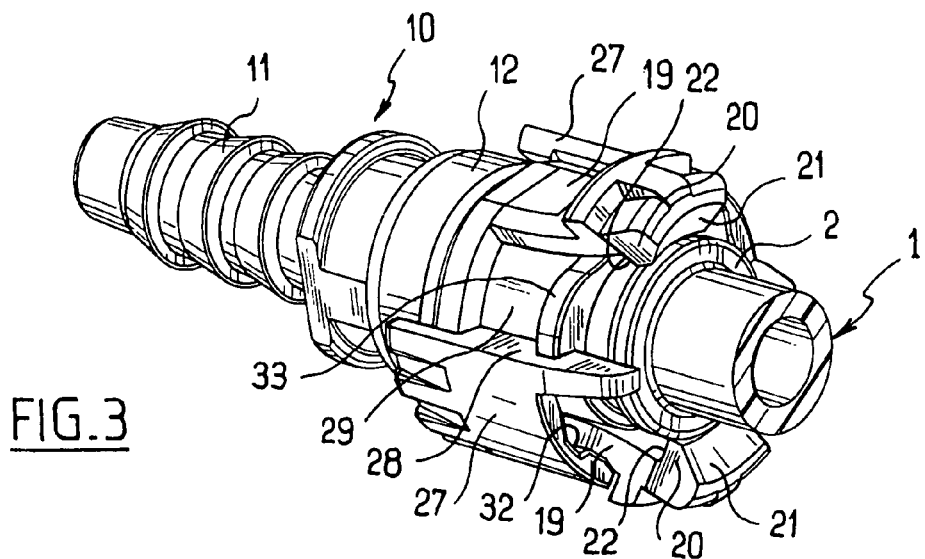
FIG. 3 is a view analogous to FIG. 2 while an endpiece is being inserted into the device.

To make a connection, the endpiece 1 is inserted into the coupling device while the holding ring is in its instant connection position (see FIGS. 2 to 4). The free end portion of the endpiece 1 is thus inserted in succession into the portions 29 and 26 of the holding ring 25, and the end segment 14, the sealing element 24, and the intermediate segment 15, until the collar 2 comes into abutment against the holding ring 25. During insertion of the endpiece 1, the outer collar 2 encounters the front face 21 of the external step 20 of the gripper end of the arm 19 which slides over the outer collar 2 and causes the arms 19 to be deformed from their gripping state to their release state (see FIG. 3).

Once the arms 19 have gone past the collar 2, they return resiliently into their gripping state, the rear faces 22 of the external steps 20 oppose any movement attempting to extract the endpiece 1 from the coupling device.

To lock the connection, the holding ring 25 is pivoted manually so as to bring the arms 19 under the flaps 27 so that they oppose any deformation of the arms 19 towards their release state (see FIG. 5). To do this, it is necessary to cause the step 30 to pass over the rib 34 (the step 30 has a chamfered end constituting a ramp for lifting the flap 27 so as to facilitate passing the step 30 over the rib 34) and then engage the external steps 23 in the setbacks 32. The holding ring 25 is then in its locking position.

It should be observed that the holding ring 25 in this embodiment contributes to guiding the endpiece 1 inside the coupling device. This serves to improve the sealing of the coupling device by limiting clearances and limiting the risk of the endpiece being ovalized under bending forces.

Disconnection is achieved by causing the holding ring 25 to pivot towards its disconnection position. During this pivoting, the arms 19 slide over the ramp 33, thereby lifting the arms 19 and deforming them into their release state (see FIG. 6). The endpiece 1 can then be extracted from the coupling device.

It should be observed that the ramps 33 oppose any accidental turning of the holding ring 25 from its free deformation position towards its release position. The resistance of the arms 19 to being deformed towards their release state provides resistance to the holding ring 25 pivoting towards the disconnection position. In addition, the rib 34 situated in the external groove 31 of the connection section 12 forms an abutment for the step 30. The force needed to pass the step 30 of each flap 27 over the rib 34 (resulting from the resistance of the flap 27 to deforming to allow the step 30 to pass) opposes any accidental pivoting of the holding ring 25 from its free deformation position towards its locking position. As a result the holding ring 25 is indexed in its instant connection position.

The rib 34 and the step 30 are preferably arranged (in terms of the height and the slope of their contacting faces) in such a manner as to oppose pivoting of the holding ring 25 from its instant connection position towards its locking position by an amount that is less than the force that needs to be used to cause the steps 23 to be moved out from the setbacks 32, while pivoting the holding ring 25 from its locking position towards its instant connection position. It is thus easier to bring the holding ring 25 into its locking position than it is to move it away therefrom. This serves to limit any risk of accidental unlocking.

The coupling device presents the advantage of being easy to disassemble and of presenting a small number of parts, thus making it easy to recycle at the end of its lifetime.

Elements that are identical or analogous to those described above are given identical numerical references in the description below of variant embodiments and in the corresponding figures.

In a first variant shown in FIG. 8, the sealing elements 24 are secured to the end portion 26 of the holding ring 25. The sealing elements may be fastened to the end portion 26 by adhesive, by overmolding, or by dual injection molding (injecting a thermoplastic elastomer compatible with the material of the holding ring 25 in a mold that receives the holding ring and that presents a recess corresponding to the sealing elements). Naturally, it is possible for only one of the sealing elements to be integral with the holding ring.

Figure 9:
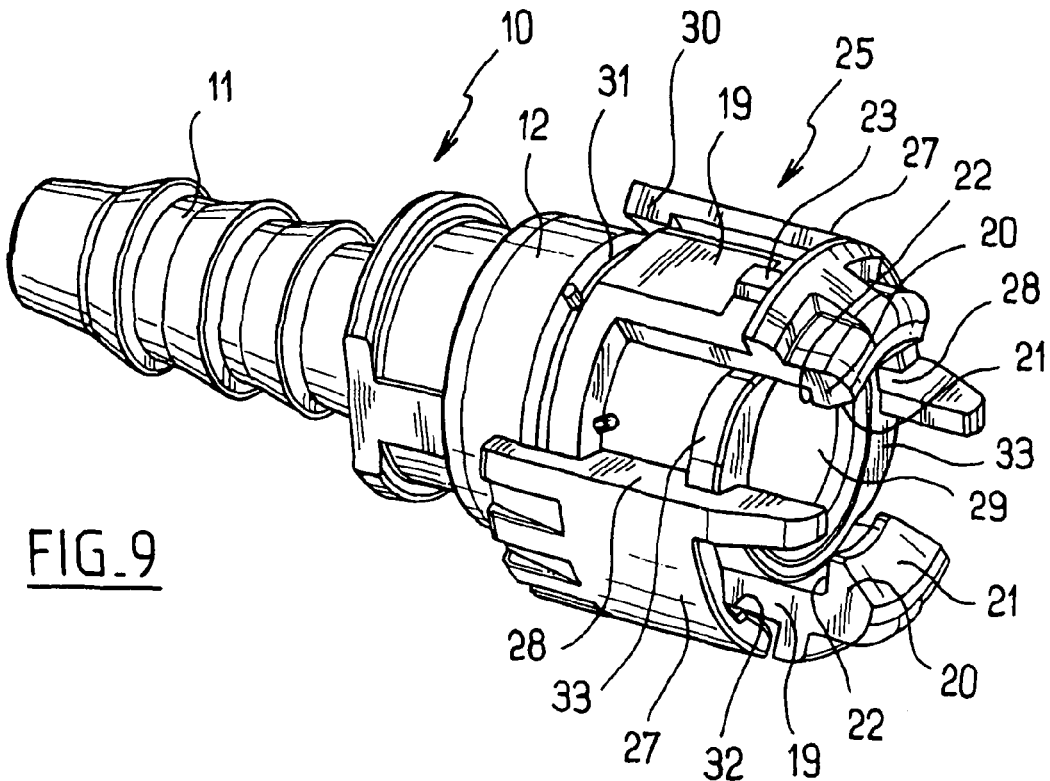
FIGS. 9 and 10 are perspective views of a coupling device constituting a second variant embodiment, the holding ring being shown respectively in an instant connection position and in a position for locking the connection.
Figure 10:
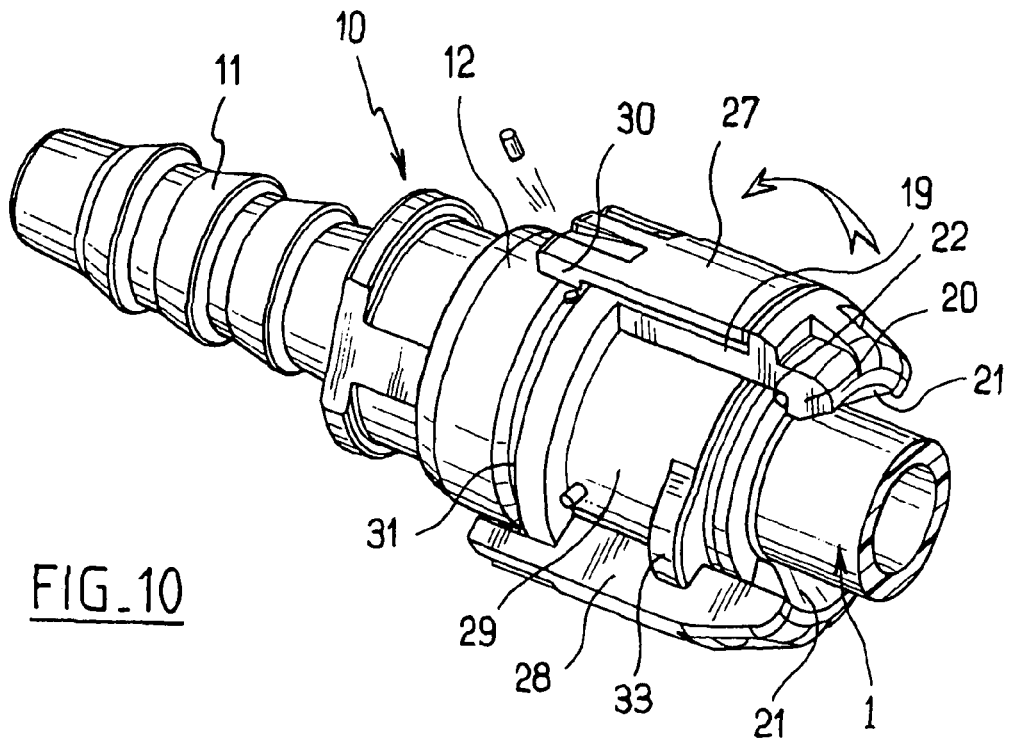

In a second variant shown in FIGS. 9 and 10, the coupling device includes locking and unlocking indicators.

The unlocking indicator is formed by a breakable stud 35 projecting outwards from the main portion 29 of the holding ring 25 on the path of one of the arms 19 during pivoting of the holding ring 25 from its free deformation position towards its disconnection position. The study 35 in this example is situated facing the ramp 33 in a position that is axially offset towards the connection section 22.

When the holding ring 25 is pivoted towards its disconnection position, the stud 35 encounters the arm 19 (close to the end thereof connected to the connection section 12) and is broken by the pivoting force. It is thus possible to verify that a disconnection is indeed the result of an unlocking movement, and not the result of a failure of the coupling device in the instant connection position or in the locking position.

The locking indicator is formed by a breakable stud 36 projecting outwards from the connection section 12, in this case in the groove 31, on the path of the step 30 of one of the flaps 27 at the end of the holding ring 25 being pivoted towards its locking position. The disposition of the stud 36 in the groove 31 limits the exposure of the stud 36 to impacts it might receive, e.g. impacts it might receive while the device is being handled and that could run the risk of accidentally breaking the stud 36.

At the end of the pivoting movement of the holding ring 25 towards its locking position, the stud 36 encounters the step 30 and breaks under the pivoting force (FIG. 10). It is thus possible, after anonymous or accidental unlocking, to verify that the coupling device had indeed been locked and that it was indeed unlocked, as opposed to forgetting to lock it at all.

These indicators thus serve to reveal how the holding ring 25 has been operated.

Figure 11:
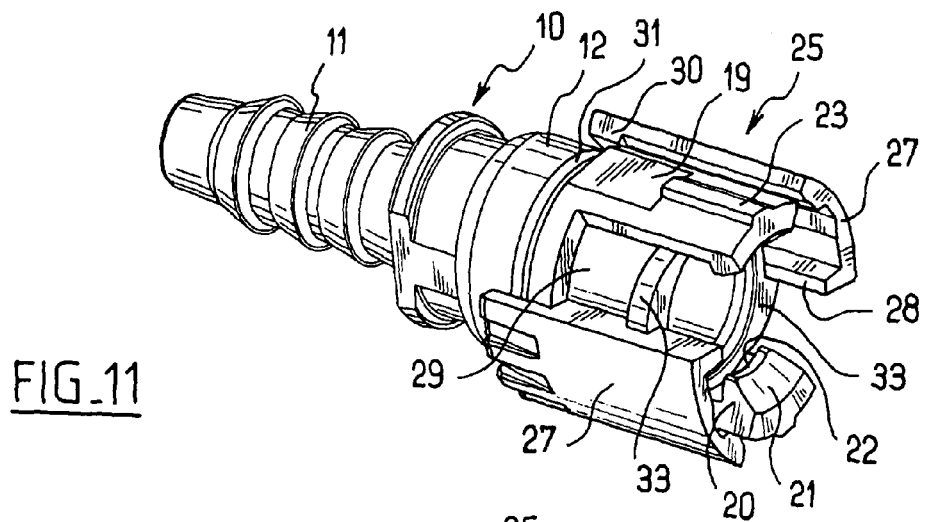
FIGS. 11 and 12 are views analogous to those of FIGS. 9 and 10 showing a coupling device constituting a third variant embodiment.
Figure 12:
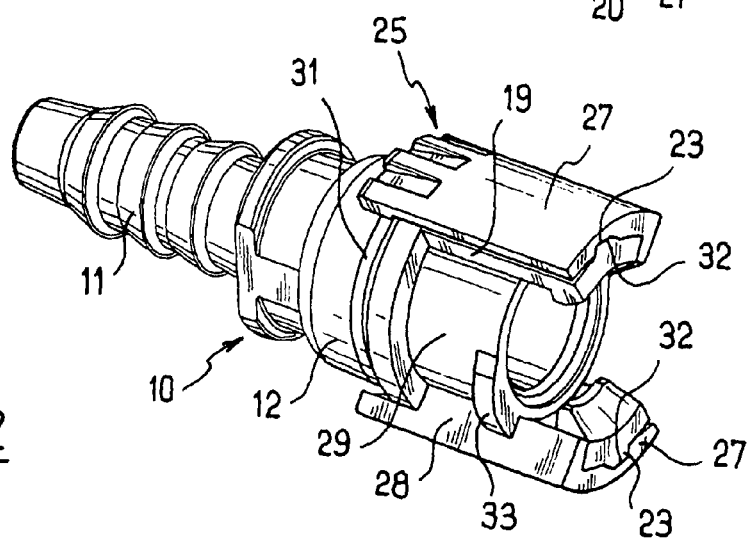

In a third variant shown in FIGS. 11 and 12, the holding ring 25 is arranged to contrast visually with the arms 19 and/or the entire body 10. Specifically, the holding ring 25 is made of a material that is of a color different from that of the material of the body 10.

The flaps 27 are arranged to cover the major fraction of the arms 19 when the holding ring 25 is in the locking position. In this position, shown in FIG. 12, the flaps 27 completely mask the arms 19. The end of the coupling device (beside the connection section 12) is then of the same color as the holding ring 25.

When the holding ring 25 is in the instant connection position (FIG. 11), or in the disconnection position, the arms 19 are visible between the flaps 27. The end of the coupling device is then two-colored.

Viewing the portions of the holding ring is thus made simpler.

In this variant, when the holding ring 25 is in the locking position, the free ends of the arms 19 are also covered by the flaps 27, thereby contributing to stiffening the arms 19 over their entire length.

Naturally, the invention is not limited to the embodiments described and variant embodiments can be provided without going beyond the ambit of the invention as defined by the claims.

In particular, provision can be made for the arms to have ends that are arranged to clamp onto a smooth pipe end and/or to bite into the outside surface thereof. FIG. 8 shows a fourth variant embodiment in which each arm 19 has a free end provided internally with a tooth 40 (in this case the tooth 40 is made of metal and has one end set in the arm 19 and a free end that projects in such a manner that the tooth 40 is inclined towards the inside of the body 10) that is arranged to bite into the outside surface of a smooth pipe. It should be observed that the smooth pipe is in abutment against the shoulder 17 that forms an abutment against the pipe penetrating further into the body 10.

It is possible to provide means for indexing the holding ring 25 in its disconnection position. Regardless of the positions indexed, indexing means are nevertheless optional.

The coupling device may be arranged in such a manner that the shoulder 17 serves as an abutment against the endpiece 1 being pushed into the body 10. Under such circumstances, the distance between the shoulder 17 and the front surface of the main portion 29 of the holding ring 25 is less than the distance between the front face of the endpiece 1 and the front face of the collar 2 ("front" relative to the direction in which the endpiece is pushed into the coupling device).

The arrangement of the body 10 and of the holding ring 25 may be modified in various ways. The number of arms and flanges may thus be different from two, the body may include a bend, the ring may be arranged to have only one holding position, . . . .

One or more abutments against turning may be arranged on the body 10 to prevent the holding ring 25 being pivoted beyond its extreme positions.

Figure 13:
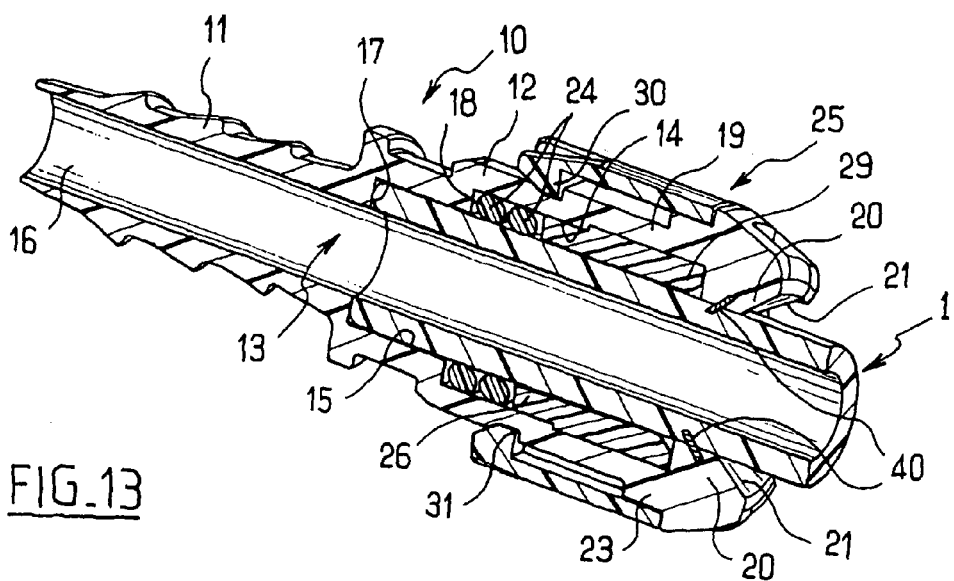
FIG. 13 is a view analogous to FIG. 5 showing a coupling device constituting a first variant embodiment.

The end of the pipe may be an endpiece fitted to a circuit element or possibly integral therewith (e.g. FIGS. 1 to 7), or it may be one end of a hose or a tube or a pipe (e.g. FIG. 13).

The number and the arrangement of the sealing elements may be different from those described. By way of example the device need have only one sealing element.

It is also possible to combine the various variants and embodiments described above.

The invention claimed is:

1. An instant coupling device for coupling a pipe end to a circuit element, the device comprising:
   a body (10) axially subdivided into a joining section (11), for joining to the circuit element, and a connection section (12) provided with a housing (14, 15) for receiving the pipe end within the connection section; and engagement means (19, 24, 25) for engaging the pipe end in leaktight manner, wherein the engagement means comprise at least one arm (19) extending axially from the connection section and having a free gripper end (20) for gripping the pipe end, said at least one arm being elastically deformable between a gripping state and a release state for releasing the pipe end, and a holding ring (25) having a structure arranged to be axially received within the connection section and to receive a portion of the pipe end and to pivot between a position allowing free deformation of said at least one arm and at least one holding position in which a surface of the ring holds said at least one arm in one of the gripping state and the release state.

2. A device according to claim 1, wherein, with the holding ring in the holding position, said at least one arm (19) in the gripping state is received at least in part under a flap (27) of the ring (25) having an inside surface that opposes deformation of said at least one arm towards the release state.

3. A device according to claim 2, wherein the inside surface of the flap (27) and an outside arm (19) have complementary portions in relief (23, 32) for co-operating when the ring (25) is in the holding position to retain the ring releasably in its holding position.

4. A device according to claim 1, wherein, with the holding ring in the holding position, said at least one arm (19) co-operates with a ramp (33) of the ring (25) for lifting said at least one arm to bring it into the release state.

5. A device according to claim 1, wherein the ring (25) possesses two holding positions that are angularly offset from each other.

6. A device according to claim 5, wherein the two holding positions are situated on either side of the free deformation position.

7. A device according to claim 1, wherein the housing (14, 15) receives at least one sealing element (24), and wherein the ring (25) includes a tubular abutment portion (26) arranged to retain the sealing element in the housing.

8. A device according to claim 7, wherein the tubular abutment portion (26) is pivotally received in the housing.

9. A device according to claim 7, wherein the sealing element (24) is secured to the tubular abutment portion (26) of the ring (25).

10. A device according to claim 1, including indexing means for indexing the ring (25) relative to the body (10) for at least one of the positions of the ring.

11. A device according to claim 1, wherein the engagement means have two arms between which the ring is received.

12. A device according to claim 1, wherein the gripper end of each arm (19) includes a tooth (40) for biting into the outside surface of the pipe end when the arm is in the gripping state.

13. A device according to claim 1, including at least one breakable indicator (35, 36) arranged to be broken when the holding ring (25) is pivoted into its holding position.

14. A device according to claim 13, wherein the breakable indicator comprises a stud (36) secured to the connection section (12) to engage a portion (20) of the holding ring (25) at the end of its pivoting into the holding position.

15. A device according to claim 14, wherein the stud (36) projects from the bottom of a groove (31) in which the portion (30) of the holding ring (25) slides.

16. A device according to claim 1, wherein the holding ring (25) is arranged to contrast visually with said at least one arm (19) and to mask said at least one arm when the ring is in its holding position.

17. An instant coupling device for coupling a pipe end to a circuit element, the device comprising:

a body (10) axially subdivided into a joining section (11), for joining to the circuit element, and a connection section (12) provided with a housing (14, 15) for receiving the pipe end within the connection section; and engagement means (19, 24, 25) for engaging the pipe end in leaktight manner, wherein the housing receives at least one sealing element (24) and wherein the engagement means comprise at least one arm (19) extending axially from the connection section and having a free gripper end (20) for gripping the pipe end, said at least one arm being elastically deformable between a gripping state and a release state for releasing the pipe end, and a holding ring (25) arranged to be connected to the connection section and to receive a portion of the pipe end and to pivot between a position allowing free deformation of said at least one arm and at least one holding position in which a surface of the ring holds the said at least one arm in one of the gripping state and the release state, said holding ring including a tubular abutment portion (26) arranged to retain the sealing element in the housing.

18. A device according to claim 17, wherein the tubular abutment portion (26) is pivotally received in the housing.

19. A device according to claim 17, wherein the sealing element (24) is secured to the tubular abutment portion (26) of the holding ring (25).

20. An instant coupling device for coupling a pipe end to a circuit element, the device comprising:

a body (10) axially subdivided into a joining section (11), for joining to the circuit element, and a connection section (12) provided with a housing (14, 15) for receiving the pipe end within the connection section; and engagement means (19, 24, 25) for engaging the pipe end in leaktight manner, wherein the engagement means comprise at least one arm (19) extending axially from the connection section and having a free gripper end (20) for gripping the pipe end, said at least one arm being elastically deformable between a gripping state and a release state for releasing the pipe end, and a holding ring (25) arranged to be connected to the connection section and to receive a portion of the pipe end and to pivot between a position allowing free deformation of said at least one arm and at least one holding position in which a surface of the ring holds said at least one arm in one of the gripping state and the release state, the device including at least one breakable indicator (35, 36) arranged to be broken when the holding ring is pivoted into the holding position, wherein the breakable indicator comprises a stud (36) secured to the connection section to engage a portion (20) of the holding ring at the end of its pivoting into the holding position, and wherein the stud projects from the bottom of a groove (31) in which the portion (30) of the holding ring slides.

* * * * *